J. A. GUTMANN.
EMERGENCY STREET CAR BRAKE.
APPLICATION FILED JUNE 25, 1910.

977,089.

Patented Nov. 29, 1910.

Witnesses

Inventor
J. A. Gutmann
By Chas E Buck
Attorney

UNITED STATES PATENT OFFICE.

JOHN A. GUTMANN, OF WILKES-BARRE, PENNSYLVANIA.

EMERGENCY STREET-CAR BRAKE.

977,089.  Specification of Letters Patent.  Patented Nov. 29, 1910.

Application filed June 25, 1910. Serial No. 568,813.

*To all whom it may concern:*

Be it known that I, JOHN A. GUTMANN, a citizen of the United States, residing at Wilkes-Barre, in the county of Luzerne and State of Pennsylvania, have invented a new and useful Improvement in Emergency Street-Car Brakes.

This invention relates to certain new and useful improvements in car brakes, and more particularly to brakes adapted to be used in connection with street cars; the object being to provide a car with an emergency brake which can be thrown into engagement with the track in such a manner that the car can be brought to a stop quickly.

Another object of my invention is to provide a brake which is operated by turn wheel carried by a shaft mounted in the platform of the car adjacent where the motorman stands, whereby the same can be readily operated by the motorman in case that the ordinary brake fails to work.

A still further object of my invention is to provide a very novel form of brake shoe, whereby the same can be quickly adjusted so as to bring another surface into position to engage the track when the same becomes worn.

Another object of my invention is to provide a brake which is exceedingly simple and cheap in construction, and one in which the crank shaft carrying the brake shoes is operated by a lever, through the medium of a chain and operating shaft, said crank shaft being normally held in such a position that shoes will be out of engagement with the track.

Figure 1:
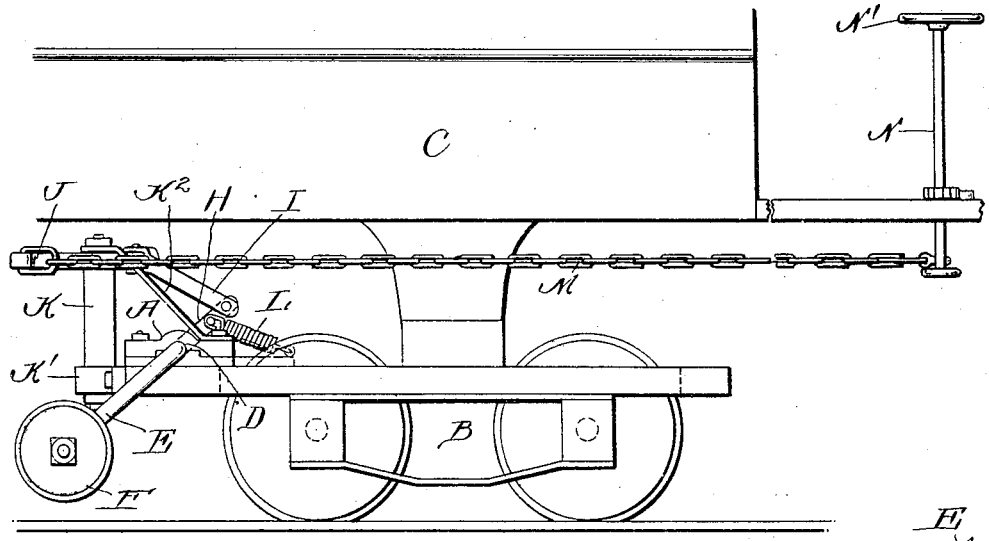
Figure 3:
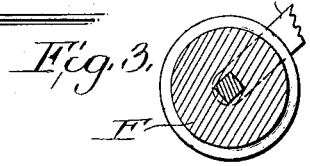
Figure 2:
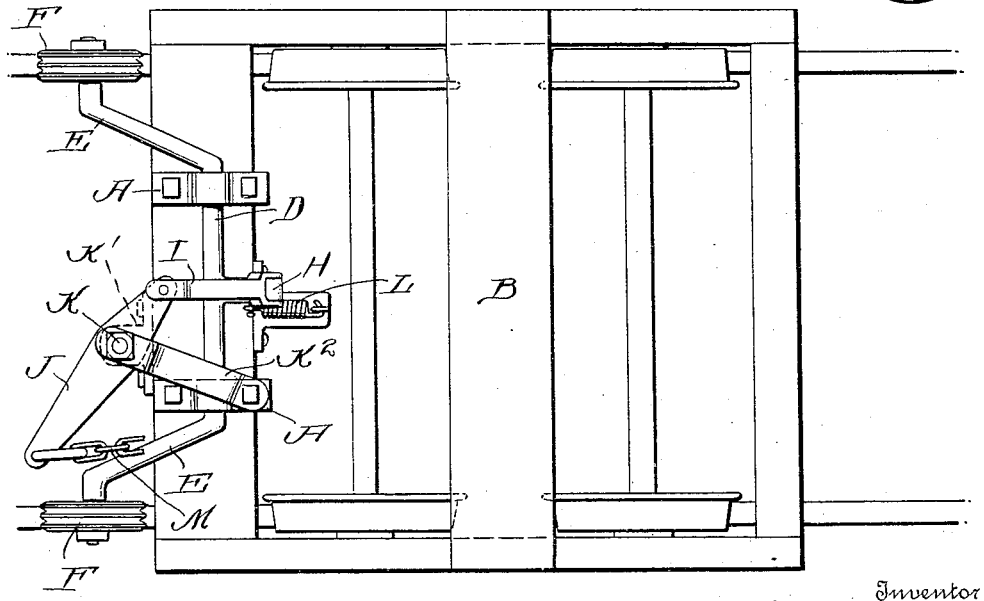

With these various objects in view, my invention consists of the novel features of construction, combination and arrangement of parts hereinafter fully described, pointed out in the claims and shown in the accompanying drawings, in which, Figure 1 is a side elevation of a car showing the application of my improved brake. Fig. 2 is top plan view, the body of the car being removed. Fig. 3 is a detailed section.

In carrying out my improved invention I employ bearing members A, adapted to be secured on the truck B of an ordinary street car C, which may be a single or double truck car. The bearings are secured on the truck to the rear of the wheels, and mounted within the bearings is a shaft D, having a crank arm E at each end, provided with a square portion on which is mounted a grooved disk F, forming a brake shoe, said disk being provided with a square opening to receive the square portion of the crank arm, so that the same can be taken off and turned, in order to bring a new wearing surface into position to engage the track.

The ends of the crank arms are threaded on which work nuts for securing the disk in position thereon, and these disks are so arranged that when the crank arm is operated they will be thrown into engagement with the track in such a manner that the frictional contact between the shoe and rail will stop the car quickly. The crank shaft is provided with a central arm H having an apertured end in which is arranged a link I, the free end of which is connected to a lever J, mounted on a post K, carried by a support K', mounted on the truck, and said post is connected to one of the bearings by a brace K². By this arrangement when the lever is turned on its pivot, the crank shaft will be rocked so as to throw the shoes into engagement with the track, and when released will be drawn back so as to raise the shoes, by a coil spring L connecting the arm H to the truck, as clearly shown.

The lever J is connected to one end of a chain M, the other end of which extends forwardly over the truck, and is connected to an operating shaft N, which extends up through the platform of the car, and is provided with a hand wheel N', for turning the same, and it will be seen, that when the shaft N is rotated the chain M will be wound around the lower end, so as to swing the lever J on its pivot, which in turn rocks the crank shaft, so as to throw the shoes into engagement with the track in such a way that the movement of the car causes the shoes to bind against the rails.

What I claim is:

1. The combination with a car, of bearings secured to the truck of the car, to the rear of the wheels, a shaft mounted in said bearings, provided with crank arms at its ends, having square portions, brake shoes comprising grooved disks, mounted on the ends of said crank arms, said shaft being provided with a central arm, a spring connecting said arm to the truck, a post carried by support arranged on said truck, a lever pivotally mounted on said post, a link connecting one end of said lever to said arm, and a chain connected to the other end of said lever, operated by a shaft having a hand wheel.

2. The combination with a car, of a crank shaft mounted in bearings carried by the truck of the car, removable brake shoes carried by the arms of said crank shaft, said shaft being provided with a central arm, a spring connecting said arm to said truck, for holding said shoes above the track, a post carried by a support arranged on said truck, a lever pivotally mounted on said post, a link connecting said lever to said arm, a chain connected to the other end of said lever, and an operating shaft mounted in the platform of the car, to which the free end of said chain is connected.

JOHN A. GUTMANN.

Witnesses:
ARTHUR H. RICHARDS,
JAMES HOWORTH.